United States Patent

[11] 3,568,140

| [72] | Inventors | Wallace B. Allen;<br>Floyd E. Blount, Dallas, Tex. |
|------|-----------|---------------------------------------------------|
| [21] | Appl. No. | 835,022 |
| [22] | Filed | June 20, 1969 |
| [45] | Patented | Mar. 2, 1971 |
| [73] | Assignee | Mobil Oil Corporation |

[54] UNDERWATER ELECTRICAL POWER SOURCE AND SONIC BEACON
20 Claims, 6 Drawing Figs.

[52] U.S. Cl..................................................... 340/4,
340/5, 136/90, 136/100
[51] Int. Cl...................................................... H04b 11/00,
H01m 17/100
[50] Field of Search............................................ 340/2, 3
(A), 4, 4 (E), 5, 6; 136/90—92, 100

[56] References Cited
UNITED STATES PATENTS

| 2,545,179 | 3/1951 | Voorhees.................... | 340/2 |
| 3,432,350 | 3/1969 | Wilson......................... | 136/90 |

*Primary Examiner*—Richard A. Farley
*Attorneys*—William J. Scherback, Frederick E. Dumoulin, Drude Faulconer, Andrew L. Gaboriault and Sidney A. Johnson ABSTRACT: The specification discloses an underwater sonic beacon for marking the location of metallic structures such as underwater wellheads. The sonic beacon is powered by a galvanic cell formed by the water as the electrolyte, the metallic structure as one electrode, and a galvanic anode spaced from the metallic structure as the other electrode. An electronic oscillator circuit and electroacoustic transducer are connected as the load on the galvanic cell. The sonic beacon is provided extended lifetime by sequentially activated anodes which produce continuous electrical power.

WALLACE B. ALLEN
FLOYD E. BLOUNT
INVENTORS

BY Drude Faulconer
ATTORNEY

WALLACE B. ALLEN
FLOYD E. BLOUNT
INVENTORS

BY Drude Faulconer
ATTORNEY 3,568,140

UNDERWATER ELECTRICAL POWER SOURCE AND SONIC BEACON

BACKGROUND OF THE INVENTION

This invention relates to a novel and improved underwater electrical power source for underwater instruments utilizing electrical power and, more specifically, to a device for marking the location of an underwater site by means of a sonic beacon signal.

Underwater instruments requiring electrical power for operation take many forms including sonic beacons for marking the location of underwater sites such as an abandoned underwater wellhead of a well used for mineral production. Such underwater instruments normally require a separate battery power supply which ordinarily has a limited lifetime for high reliability on the order of less than three or four years.

Sometimes it is desirable to leave an underwater installation for longer periods of time; for example, where it is desired to leave a sonic beacon to mark the location of a temporarily abandoned wellhead. At some later time, a search craft with sonic receiving equipment can return to the general vicinity of the abandoned wellhead and establish the exact relocation of the wellhead by determining the location of greatest sonic beacon signal intensity.

SUMMARY OF THE INVENTION

The present invention provides a novel underwater electrical power source for powering a utilization device located at the site of a metallic structure, such as a wellhead, immersed in a body of water. This novel power source comprises a plurality of galvanic anodes spaced from the metallic structure in the body of water. Each galvanic anode has a different activation time with respect to the others, such that as one galvanic anode is consumed additional anodes are activated in sequence to provide continuous electrical power. A first electrical lead extends from the metallic structure to one input terminal of the utilization device and a second electrical lead extends from the galvanic anodes to the other input terminal of the utilization device.

By another aspect of the present invention, a novel sonic beacon is provided for marking the location of underwater metallic structures. The sonic beacon is powered by a galvanic cell formed by the water as an electrolyte, the metallic structure to be marked as one electrode, and a galvanic anode spaced from the metallic structure as the other electrode. An electronic oscillator circuit and electroacoustic transducer are connected as the load in the galvanic cell. Hence, electrical power is obtained for the sonic beacon in an inexpensive manner not requiring self-contained batteries as in the prior art. As a bonus feature, cathodic protection for the metallic structure is provided by the flow of current through the sonic generator and metallic structure.

By a further aspect of the present invention, the sonic beacon is provided with an extended lifetime by employing sequentially activated galvanic anodes which provide sequentially activated galvanic cells to create continuous electrical power. These galvanic anodes are arranged in such a way that they are activated in sequence so that when one galvanic anode is depleted, successive galvanic anodes become corroded by the action of water and are exposed to the sea water to form an active galvanic anode. In this way, by establishing sequentially activated galvanic anodes a lifetime for the sonic beacon can be provided for any desired period, for example, on the order of ten years or more.

BRIEF DESCRIPTION OF THE DRAWINGS

The invention will be further described with reference to certain specific embodiments thereof and the accompanying drawings in which.

DESCRIPTION OF SPECIFIC EMBODIMENTS

Figure 1:
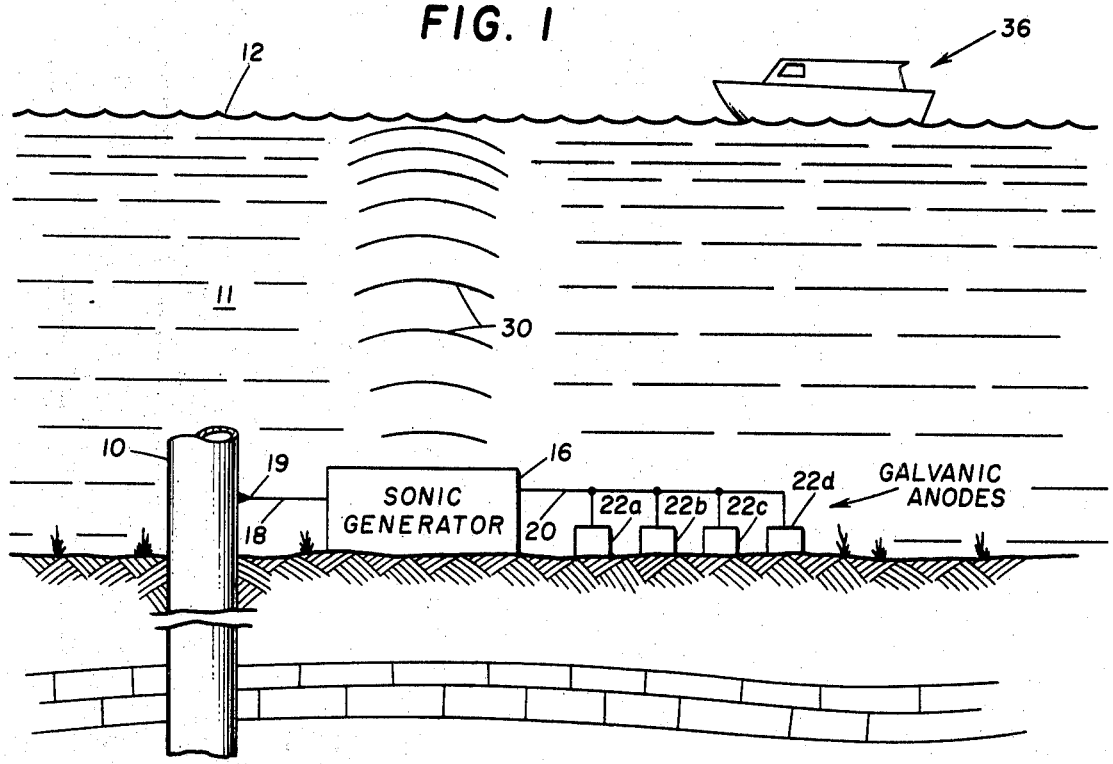
FIG. 1 is a schematic diagram of the underwater electrical power source of the present invention embodied to drive an underwater sonic beacon for marking the location of an underwater wellhead structure.

FIG. 1 shows the present invention embodied in a sonic beacon for marking the location of an underwater well having a metallic wellhead structure 10 located beneath the surface 12 of a body of water 11. The beacon comprises a sonic generator 16 which is connected by an electrical lead 18 to a terminal 19 on the wellhead structure 10. Sonic generator 16 is also connected by an electrical lead 20 to a group of galvanic anodes $22a$—$22d$.

The galvanic anodes $22a$—$22d$ may include the conventional type of consumable metal used in cathodic protection systems, but preferably is comprised of magnesium which provides a large net driving potential. The galvanic anodes $22a$—$22d$ form one electrode of a galvanic cell, which includes as the other electrode, the wellhead structure 10 and the body of water 11 as the electrolyte.

The electrical potential presented at the input terminals of sonic generator 16 causes generator 16 to generate sonic vibrations or waves represented schematically by wavefronts 30 which provide a beacon signal for reception by a search craft 36 carrying sonic receiving equipment. The beam of sonic vibrations 30 may, in one embodiment, be normal to the surface 12 of the body of water 11 so that the location of greatest sound intensity is immediately above the location of the wellhead structure 10. Accordingly, as the search craft 36 follows a search pattern in the general vicinity of the wellhead structure 10, the location of wellhead structure 10 may be pinpointed by determining the location at which the intensity of the sonic beacon signal is the highest.

Figure 2:
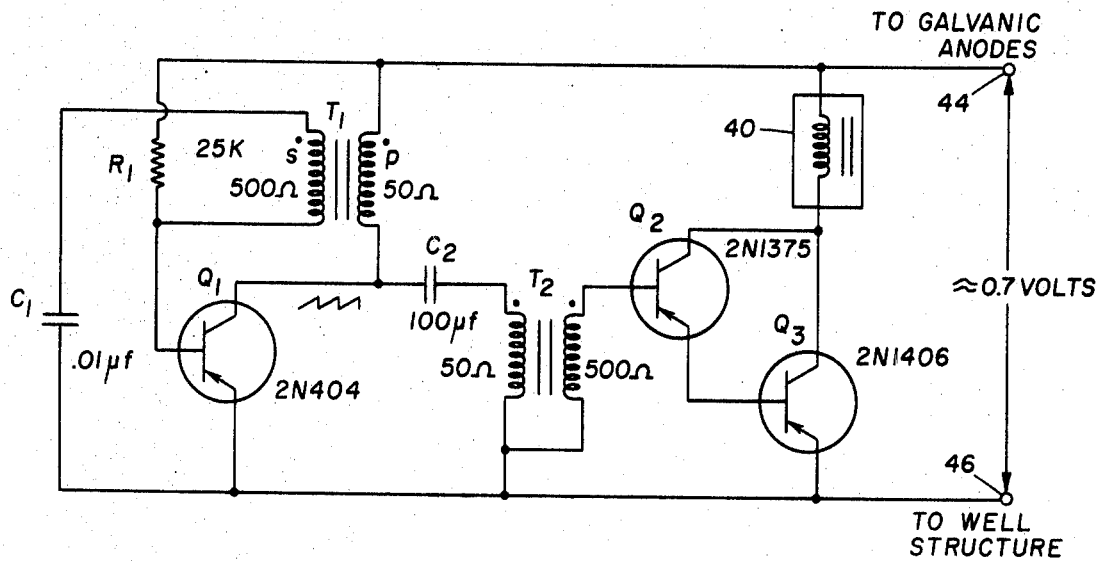
FIG. 2 is a schematic circuit diagram of one type of sonic generator which can be used with the present invention.
Figure 3:
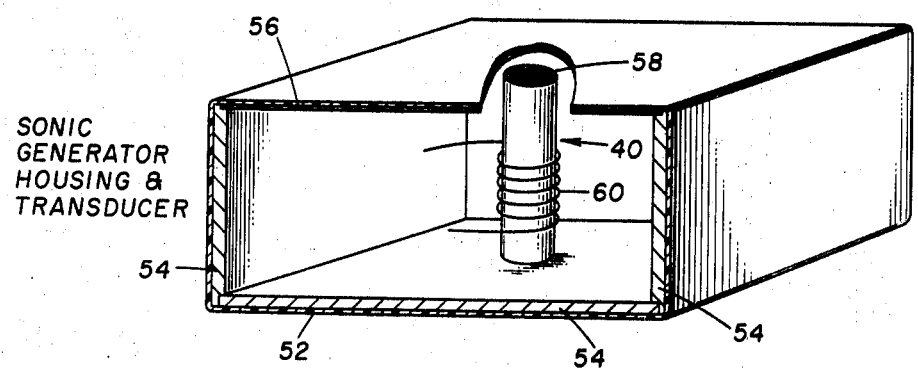
FIG. 3 is a schematic perspective view, partially in cross section and partially cut away, of one type of housing and transducer assembly of a sonic generator.

FIG. 2 illustrates a schematic circuit diagram for one type of sonic generator 16 comprising an oscillator stage including a transistor $Q_1$, an amplifier stage including transistors $Q_2$ and $Q_3$, and an electroacoustic transducer 40. Typical component values and types are shown in FIG. 3 by way of an example and not limitation. The circuit shown is designed to operate with a potential of about 0.7 volt such as would be provided by the net driving potential of a galvanic cell created by galvanic anodes $22a$—$22d$ of the magnesium type.

In the circuit of FIG. 2, the terminal 44 is connected to the galvanic anodes $22a$—$22d$ and the terminal 46 is connected to the wellhead structure 10. The oscillator stage illustrated is a relaxation or blocking oscillator which comprises a capacitor $C_1$, a transistor $Q_1$, a resistor $R_1$, and a transformer $T_1$. In operation, current flows from terminal 46 through the emitter and collector of transistor $Q_1$, the primary P of transformer $T_1$ to the terminal 44. Rising current flowing through the primary P of transformer $T_1$ induces current in the secondary S thereof which charges capacitor $C_1$ and applies current into the base of transistor $Q_1$ to drive it into nonconduction. When transistor $Q_1$ is in the nonconductive state, no current is induced to secondary S and so capacitor $C_1$ begins to discharge through resistor $R_1$. When capacitor $C_1$ is discharged sufficiently to allow transistor $Q_1$ to become conducting again, current begins to flow through the emitter-collector of transistor $Q_1$ to again induce current in the secondary S and recharge capacitor $C_1$. The cycle of oscillation continues to repeat so that a sawtooth current waveform is generated at the collector of transistor $Q_1$.

The sawtooth current waveform appearing at the collector of transistor $Q_1$ is coupled through capacitor $C_2$ and transformer $T_2$ into the amplifier stage which is a Darlington circuit comprising transistors $Q_2$ and $Q_3$ connected in cascade. The amplifier stage amplifies the sawtooth waveform generated in the oscillator stage and drives the electroacoustic transducer 40 to generate sonic waves. For the specific circuit shown in FIG. 2 the pulse repetition frequency is approximately 2,000 c.p.s.

The electroacoustic transducer 40 is preferably of a type which is responsive to current excitement to create large sonic vibrations. For example, transducer 40 may be of the magnetostrictive type, may be a conventional loud speaker adapted for underwater use, may be of barium titanate, or other suitable transducer design.

FIG. 3 illustrates one type of mechanical structure for the sonic generator 16. The structure includes a housing which is hermetically sealed by means of a coating 52 of a suitable material such as plastic. The housing is constructed of rigid side and bottom walls 54 and a flexible top wall 56 which forms an acoustic diaphragm.

The electroacoustic transducer 40 is formed by a bundle of wires 58 which is oriented perpendicular to the top and bottom walls 56 and 54, respectively. The bundle of wires 58 is wrapped with a coil of wire 60 which is connected in circuit with the oscillator and amplifier circuit. When electrical pulsations flow through coil 60, the length of the bundle of wires 58 expands and contracts by magnetostrictive action to cause flexure of the top wall 56 so that sonic vibrations are induced in the surrounding water. The bundle of wires 58 may be attached by any suitable means, e.g. brazing, to the bottom wall 54 and may be free at the upper end in contact with the upper wall 56.

In a design example, transducer 40 has the following specifications: 150 turns of No. 20 enamel magnet wire on one-half inch diameter bundle of No. 18 nickel wires of 4-inch length.

Referring again to FIG. 1, the galvanic anodes 22a—22d are in accordance with one embodiment of the present invention sequentially activated so as to provide extended lifetime for the electrical power source and the sonic generator 16. For example, the galvanic anode 22a, when initially placed in operation, is exposed to the body of water 11 and begins to operate by galvanic action to provide electricity for sonic generator 16. The remaining galvanic anodes 22b—22d are electrically connected by lead 20 to the sonic generator 16, but are not activated. More specifically, the galvanic anodes 22b—22 are adapted to be activated at predetermined delay times; for example, galvanic anode 22b is designed to activate 2 years after initial immersion in the body of water 11, anode 22c 4 years after immersion, and anode 22d 6 years after immersion. Hence, when the galvanic anode 22 a is consumed, for example, over a 2-year period, the galvanic anode 22b becomes activated to provide electric potential for the sonic generator 16. When the galvanic anode 22b becomes consumed after an additional 2-year period, galvanic anode 22c becomes activated, and so on.

In accordance with one embodiment of the present invention, the galvanic anodes 22a—22d are sequentially activated by the agency of a material which corrodes in the electrolyte environment at a predetermined rate. Each delay-activation galvanic anode is enclosed by a casing which hermetically seals a body of anode material, but includes a corrodible material which corrodes at a predetermined rate in an electrolyte.

Figure 4:
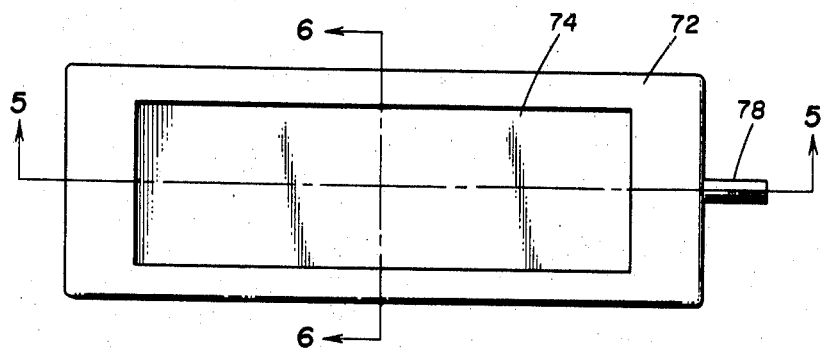
FIG. 4 is an elevational view of one type of delay-activation galvanic anode.
Figure 5:
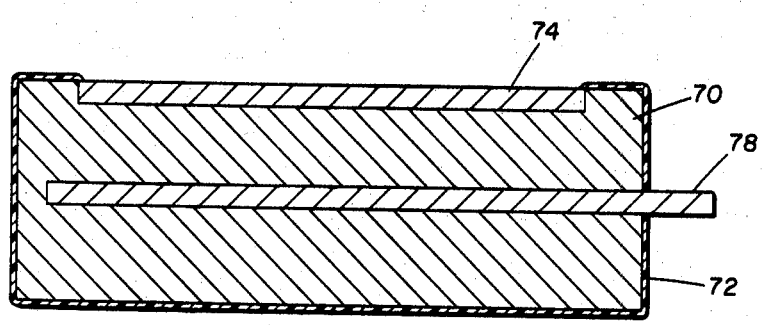
FIG. 5 is a sectional view taken along line 5—5 in FIG. 4.
Figure 6:
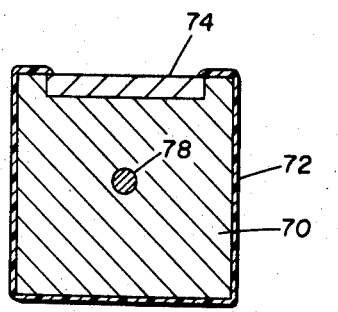
FIG. 6 is a sectional view taken along line 6—6 in FIG. 4.

FIGS. 4—6 illustrate one such delay-activation galvanic anode which is described and claimed in a copending application entitled "Cathodic Protection System and Delay-Activation Anode," Ser. No. 835,023, filed Jun. 20, 1969. The galvanic anode illustrated comprises a body of anode material 70, such as magnesium, which is encased by a coating 72 of a suitable material such as plastic, which is substantially impervious to corrosive action in the electrolyte intended for use. A plug or plate 74 of some corrodible material, such as iron, forms a closure for an opening in the casing or coating 72. The thickness, size, and properties of the plate 74 are chosen so as to provide a predetermined rate of corrosion when exposed to a particular electrolyte. For example, in order to provide a delay activation of 2 years, a plate of iron on the order of one-fourth inch thick may be used for an electrolyte of sea water. Embedded in the body of anode material 70 is a metallic core or rod 78 which provides an electrical terminal for the galvanic anode.

One process for manufacturing the delay-activation galvanic anode assembly shown in FIGS. 4—6 comprises casting the body of anode material 70 around the metallic core 78 in any desired molding shape. The plate of corrodible material 74 can then be cast in the recess formed in the side of the body of anode material 70 as shown in FIGS. 4—6. The casing for hermetically sealing the galvanic anode assembly can be formed by coating the body of anode material 70 with a coating material 72 of plastic material such as polyvinylchloride. The coating material can be applied to all the portions of the body of anode material 70 except the corrodible plug 74, which remains exposed to the exterior.

We claim:
1. An electrical power source for a utilization device located at the site of a metallic structure immersed in a body of water, comprising:
   a. a plurality of galvanic anodes spaced from said metallic structure in said body of water, each anode having a different activation time with respect to the others;
   b. a first electrical lead extending from said metallic structure to one input terminal of said utilization device; and
   c. a second electrical lead extending from each of said anodes to another input terminal of said utilization device, whereby continuous electrical power is supplied to said utilization device by galvanic action as said anodes become sequentially activated.

2. An electrical power source as defined in claim 1 wherein said utilization device comprises a sonic generator adapted to produce sonic waves which serve as a beacon signal to mark the location of said metallic structure.

3. An electrical power source as defined in claim 1 wherein said metallic structure comprises the wellhead structure of a well extending into the earth beneath said body of water.

4. An electrical power source as defined in claim 1 wherein each of said galvanic anodes comprises:
   a. a body of anode material;
   b. an electrical lead secured to said body of anode material; and
   c. a hermetic casing enclosing said body of anode material, at least a portion of said casing comprising a relatively corrodible material exposed to the exterior thereof, whereby said anodes may become exposed to said body of water at a delayed time after location therein.

5. An electrical power source as defined in claim 4 wherein at least a portion of said casing comprises a coating of plastic material on said body of anode material.

6. An electrical power source as defined by claim 4 wherein said corrodible material comprises a plate sealed in an opening in said casing and secured to the exterior of said body of anode material.

7. An electrical power source as defined in claim 4 wherein said body of anode material comprises magnesium.

8. An electrical power source as defined by claim 6 wherein said plate comprises iron.

9. An electrical power source as defined by claim 2 wherein said sonic generator comprises:
   a. an electroacoustic transducer; and
   b. an oscillator and amplifier circuit coupled between said metallic structure and said galvanic anodes, said circuit being also coupled to said electroacoustic transducer to excite said transducer with electrical pulsation whereby said transducer may generate sonic waves.

10. A sonic beacon for a metallic structure located in a body of water, comprising:
   a. a galvanic anode spaced from said metallic structure in said body of water;
   b. a sonic generator;
   c. an electrical lead extending from said metallic structure to one terminal of said sonic generator; and d. a second electrical lead extending from said galvanic anode to another input of said sonic generator, whereby electrical power is provided said sonic generator to produce a sonic beacon signal.

11. A sonic beacon as defined by claim 10 wherein said sonic generator comprises:
    a. an electroacoustic transducer; and
    b. an oscillator and amplifier circuit coupled between said metallic structure and said galvanic anodes, said circuit being also coupled to said electroacoustic transducer to excite said transducer with electrical pulsations whereby said transducer may generate sonic waves.

12. sonic beacon as defined by claim 11 further including a plurality of galvanic anodes spaced from said metallic structure in said body of water, each anode having a delay-activation time with respect to the others, and each anode being connected to said metallic structure by said second electrical lead, whereby said plurality of galvanic anodes may be sequentially activated to provide extended-life electrical power for said sonic generator.

13. A sonic beacon as defined by claim 12 wherein each of said galvanic anodes comprises:
    a. a body of anode material;
    b. an electrical lead secured to said body of anode material; and
    c. a hermetic casing enclosing said body of anode material, at least a portion of said casing comprising a relatively corrodible material exposed to the exterior thereof, whereby said galvanic anodes may become exposed to an electrolyte at a delayed time after location therein.

14. A sonic beacon as defined by claim 13 wherein at least a portion of said casing comprises a coating of plastic material on said body of anode material.

15. A sonic beacon as defined by claim 13 wherein said casing comprises a plate sealed in an opening thereof, said plate comprising a relatively corrodible material such that the corrosive action of said body of water will create a passageway through said opening to expose said body of anode material to said body of water.

16. A sonic beacon as defined by claim 11 wherein said electroacoustic transducer is of the magnetostrictive type.

17. A sonic beacon as defined by claim 13 wherein said anode material comprises magnesium.

18. A sonic beacon as defined by claim 13 further comprising:
    a. a housing enclosing said electroacoustic transducer and said oscillator and amplifier circuit;
    b. a flexible diaphragm in said housing;
    c. a bundle of wires in said housing disposed in contact with said flexible diaphragm; and
    d. a coil of wire surrounding said bundle of wires and connected to said amplifier circuit, whereby electrical pulsations generated by said oscillator circuit and passing through said coil may cause said wires to change longitudinal dimension by magnetostrictive action and cause said flexible diaphragm to vibrate and produce sonic waves.

19. A sonic beacon as defined by claim 10 wherein said metallic structure comprises the wellhead structure of a mineral well extending into the earth underlying said body of water.

20. A sonic beacon as defined by claim 18 wherein said flexible diaphragm is oriented to generate sonic waves in a direction perpendicular to the surface of a body of water.